INVENTORS
CARL D. KEITH
JOHN J. MOONEY
KENNETH W. BLAMBLE

BY

ATTORNEY

United States Patent Office 3,597,165
Patented Aug. 3, 1971

3,597,165
CATALYTIC EXHAUST PURIFIER
Carl D. Keith, Summit, John J. Mooney, Wyckoff, and Kenneth W. Blamble, Murray Hill, N.J., assignors to Engelhard Minerals & Chemicals Corporation, Newark, N.J.
Filed June 18, 1969, Ser. No. 834,376
Int. Cl. B01j 9/04; F01n 3/14
U.S. Cl. 23—288F
2 Claims

ABSTRACT OF THE DISCLOSURE

A catalytic purifier for the treatment of internal combustion engine exhausts, designed to eliminate external manifolding to separately housed catalyst bodies, has a catalyst support plate equipped for housing a plurality of ceramic catalyst blocks. It is particularly useful for purifying exhausts of large displacement engines, e.g., those exceeding 400 in.$^3$/cycle.

BACKGROUND OF THE INVENTION

This invention relates to a device for the purification of exhaust gases from internal combustion engines. It is particularly adapted for engines which emit large volumes of exhaust gas, for example, multicycle diesel engines.

Many exhaust treatment systems have been proposed for the removal of noxious constituents of internal combustion engine exhaust streams. Highly effective catalysts suggested for such systems are shaped ceramic skeletal structures with gas flow passages therethrough which are provided with catalytic deposits. Catalysts of this type have been described in U.S. Pats. No. 3,331,787 and No. 3,441,381. Such catalysts, referred to hereinafter as ceramic block catalysts, have known advantages over particulate catalysts for purification of exhaust streams. They have high superficial areas per unit volume and are therefore highly active catalytically. They permit the use of high space velocities with low pressure drop. Their straight through channels minimize plugging by particulate matter. Also, there are no bed-orientation problems, i.e., the bed can be mounted in any position—horizontal, vertical, etc.

Despite the many advantages, the unitary ceramic block catalysts have been found to have practical limitations in their use which heretofore have made them unsuitable to treat exhausts of large displacement engines, e.g. engines having a displacement greater than about 400 in.$^3$/cycle. The ceramic skeletal structures are supplied commercially in units having a size in cross section of about 9″ x 9″ and it is therefore convenient to restrict the size accordingly. Of greater importance, it is unwise to use a larger skeletal structure because at a larger size it becomes too difficult to accommodate for the difference in thermal expansion between the metal shells used to house the catalysts and the low expansion ceramics housed therein. Moreover, the larger the ceramic body, the more likely it is to be harmfully affected by vibrations of an engine and the jars of a moving vehicle. One method of solving this problem is to use more than one individually housed ceramic block catalyst. However, prior art devices require external manifolding to such catalyst units. It will be appreciated that such manifolding not only requires an additional amount of the limited space available but also necessarily causes a lowering of the temperature of the exhaust before it contacts the catalysts.

The temperature and back pressure problems take on significant proportions, for example, in the case of 2-cycle and 4-cycle diesel engines. Typically, the exhaust of a 2-cycle diesel engine is 200° to 500° F. (about 95 to 260° C.), depending upon the speed and mode of operation, e.g. acceleration, deceleration, cruising or idling, and the exhaust of a 4-cycle diesel engine is about 400° to 800° F. (about 200 to 425° C.), both lower than the exhaust temperature of spark-type gasoline fueled internal combustion engines which is about 650° to 1250° F. (about 345 to 680° C.). Since the ignition temperature of the ceramic block catalyst, using a relatively low ignition temperature platinum-group metal catalyst, is still high relative to the exhaust temperature range of the diesel engines, e.g. with palladium the ignition temperature is about 350 to 400° F. (about 175° to 200° C.), it is highly undersirable that the exhaust fall to a lower temperature before it contacts the catalyst. The allowable back pressure for 2-cycle diesel engines is about 55 inches of $H_2O$, and for 4-cycle about 20 inches of $H_2O$.

It is an object of the present invention to provide an exhaust purifier device capable of handling internal combustion engine exhaust. It is another object to provide a device capable of handling the exhaust of large displacement engines. A further object is to provide a device with a plurality of ceramic block catalyst bodies which eliminates the need for external manifolding of the exhaust to individual catalyst bodies. Another object is to provide an exhaust purifier which operates effectively with a low back pressure. A still further object is to provide a device capable of effectively purifying multi-cycle diesel engine exhausts.

Other objects and advantages of the present invention will become apparent from the following descriptions of the invention and the accompanying drawings.

SUMMARY OF INVENTION

Briefly, this invention provides a catalytic exhaust purifying device comprised of a metal housing having gas receiving and gas outlet ports at opposite ends, a transverse apertured catalyst support plate spaced intermediate said ports and partitioning the housing into inlet and outlet sections, a plurality of ceramic block catalyst elements maintained separately from each other and secured to said catalyst support plate, means to maintain the catalyst elements separately from each other and means to secure the catalyst elements individually in said catalyst support plate.

The ceramic block catalyst elements useful for this invention are briefly described as inert ceramic skeletal structures having a large plurality of unobstructed gas flow channels therethrough in the direction of gas flow and catalytically active materials deposited thereon. The gas flow channels of the skeletal ceramics are generally parallel, adjacent paths and they may have cross-sections of any desired shape. For example, the cross-sectional configuration may be described as a corrugated or honeycomb pattern. The channels in the ceramic are relatively large compared to the thin walls by which they are defined. Suitable ceramic block catalysts and their method of preparation are described in the above-mentioned U.S. Pats. No. 3,331,787 and No. 3,441,381.

The ceramic block catalysts are positioned in the apertures of the catalytic support plate with their gas flow channels in the direction of gas flow through the purifier, so that in operation the exhaust stream passes from the inlet section of the housing through the gas flow passages of the ceramic block catalysts, wherein such exhaust stream is treated catalytically for the removal of impurities, and then through the outlet section of the housing.

BRIEF DESCRIPTION OF THE DRAWINGS

FIG. 4b is a plan view of the outlet side of the catalyst support plate of FIG. 4a.

DESCRIPTION OF THE PREFERRED EMBODIMENTS

Figure 1:
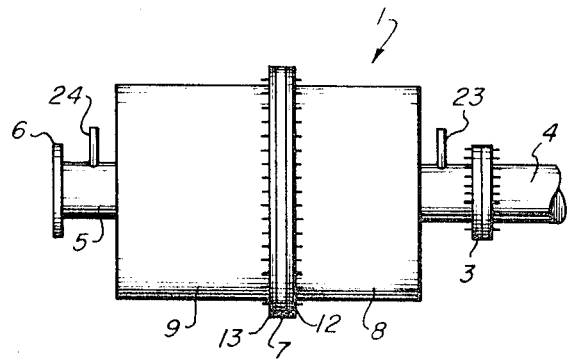
FIG. 1 is a side elevational view of the catalytic exhaust purifier of the invention attached to a tail pipe.
Figure 2:
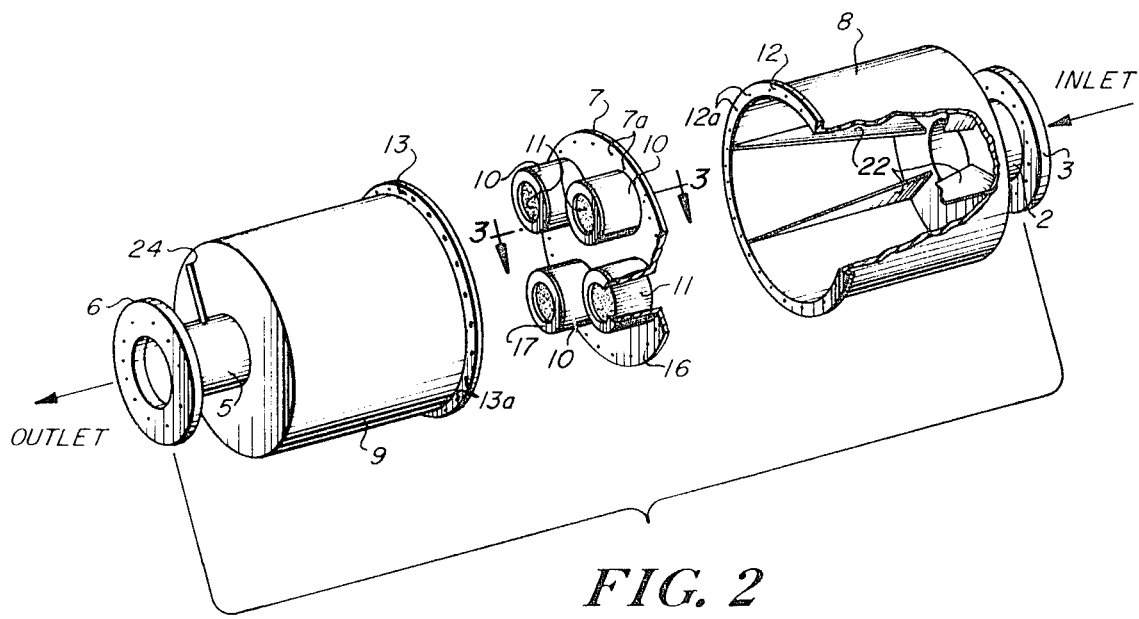
FIG. 2 is an exploded isometric view, partially in section, showing the components of an exhaust device of this invention.

Referring in detail to the accompanying FIGS. 1, 2, 3 and 5, the device is comprised of a cylindrical metal housing 1 having an inlet port 2 adapted to be connected by flange 3 in an exhaust line 4 of an internal combustion engine, e.g. a 2-cycle diesel engine (not shown), and an outlet port 5 adapted to be connected by flange 6 to an exhaust pipe or vent (not shown), which vents the exhaust gases to the atmosphere. Catalyst support plate 7, which divides the housing into inlet and outlet sections 8 and 9, respectively, is equipped with four tubular members 10 for retaining four ceramic block catalyst elements 11. The inlet and outlet sections 8 and 9 of the housing 1 are bolted together with the catalyst support plate 7. FIG. 2 shows inlet region 8 provided with flange 12 having holes 12a for bolts therein, outlet section 9 provided flange 13 having holes 13a for bolts therein and catalyst plate 7 having around the peripheral edge holes 7a for bolts. FIG. 1 shows the two sections 8 and 9 of the housing bolted together with support plate 7. For ready replacement, the inlet-outlet sections 8 and 9 and support plate 7 can be unbolted and the support plate replaced with another support plate having fresh or regenerated catalytic elements retained therein.

Figure 3:
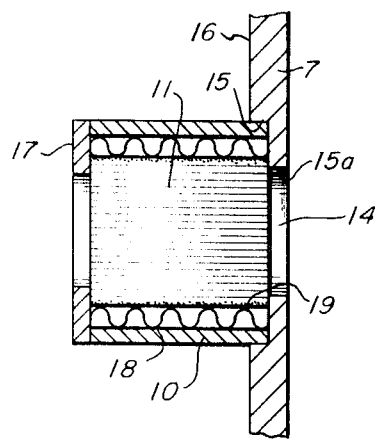
FIG. 3 is an enlarged fragmentary sectional detail taken on line 3—3 of FIG. 2 showing a ceramic block catalyst encased in a tubular member and secured in a support plate.

Catalyst support plate 7 has four apertures 14 therethrough, one of which is shown in the fragmentary section of FIG. 3. The four tubular members 10 are positioned and welded in recesses 15 provided around the apertures 14 on the outlet side 16 of the support plate 7. The diameter of each of said apertures 14 is smaller than the diameter of the ceramic block catalyst element 11 retained therein, thereby providing a peripheral seat 15a for the catalyst elements in each of the recessed portions of the support plate 7. The outer diameter of recesses 15 are of a diameter to snugly recive tubular members 10. Each of the ceramic block catalyst elements 11 is secured in one of the tubular members 10 on its downstream side by an annular metal rim 17, which is integral with the tubular member 10 and of smaller diameter than the catalyst element 11, and each of said catalyst elements is secured laterally by a resilient means 18 snugly positioned between said ceramic block catalyst and the inner wall of the tubular member. The annular metal rim 17 may be, for example, a flange integral with the tubular member 10 and inwardly extending over the peripheral edge of the ceramic block catalyst element 11 housed therein. The peripheral seats 15a of the recessed portion of plate 7 and the annular metal rims 17 not only secure the catalyst in a tubular member but also serve as a gas flow and insulating barriers. Preferably a layer of Fiberfrax cement 19, a fibrous aluminum silicate, is provided around the outer surface of the ceramic block catalyst elements 11. The resilient means 18 may be, for example, a corrugated knitted metal mesh fabric. This resilient means absorbs mechanical shock and compensates for the differences in thermal expansion between tubular members 10 and the ceramic catalyst elements 11 encased therein. U.S. Pat. No. 3,441,381, referred to above, gives examples of metal rim barrier members and resilient means that are suitably used in the present invention. The purifier device of said patent differs from the present invention in that the devices of U.S. Pat. 3,441,381 require separate external manifolding of the exhaust to each of the encased ceramic block catalyst elements and the present invention, as shown in FIG. 2, requires no such separate external manifolding. According to the present inveintion, a plurality of the ceramic block elements are secured within a single non-manifolded housing by means of the catalyst support plate.

Figure 5:
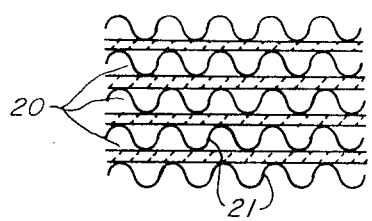
FIG. 5 is a greatly enlarged fragmentary cross-sectional view of a ceramic block catalyst useful in this invention.

The ceramic block catalyst elements useful for this invention are briefly described as inert ceramic skeletal structures having gas flow channels therethrough and catalytically active materials deposited thereon, and, as indicated above, suitable ceramic block catalysts and their method of preparation are described in the abovementioned U.S. patents. FIG. 5 is a diagrammatic representation of a fragmentary section of a typical ceramic block catalyst element having gas flow channels 20 defined by thin ceramic walls 21. The channels have a coating of catalytic material thereon (not shown). Skeletal ceramics, e.g. of alpha-alumina or zircon-mullite, useful as the catalyst supports are commercially available, for example, from the American Lava Company under the name of ThermaComb brand corrugated ceramics, or from E. I. du Pont de Nemours and Company under the name of Torvex. ceramic honeycomb. The skeletal support is coated with a catalytically active material, i.e. a catalytically active metal on a thin coating of active refractory metal oxide. Suitable active metal oxides are active or calcined alumina, beryllia, magnesia, thoria, silica etc. and combinations thereof. Activated alumina is a preferred active refractory metal oxide. Low ignition oxidation catalysts are used, preferably the platinum group metal catalysts, e.g. palladium or platinum. The concentration of metal oxide is typically 5% to 20% by weight and the concentration fo catalytic metal is typically 0.01% to 5.0% based on the total weight of the catalytic material and the skeletal support.

In a preferred embodiment, the active refractory metal oxide is deposited as a thin coating on the skeletal ceramic block. Generally the total surface area of the active refractory oxide is at least 25 square meters/gram, preferably at least 100 square meters/gram. Such oxides can be prepared by dehydrating, preferably substantially completely, the hydrate form of the oxide by calcination at elevated temperatures. Suitable alumina can be prepared, for example, by precipitating a hydrous alumina gel followed by drying and calcination to expel hydrated water and provide active gamma-alumina.

One method of providing the ceramic skeletal support with the active refractory metal oxide is by dipping the support into an aqueous suspension, dispersion or slurry of the refractory metal oxide, e.g. having a solids content of 10% to 70% by weight, drying and calcining. In general calcining temperatures within the range of 150° to 800° C. are employed. The refractory metal oxide is deposited on the surface of the skeletal structures including the channel surfaces in an amount, by weight of 1% to 50% and preferably 5% to 30%, based on the weight of the skeletal structure.

Application of the low ignition oxidation catalyst to the support can be effected by conventional techniques, for example, by immersing the skeletal structure with the refractory metal oxide deposited thereon in an aqueous solution of a water soluble inorganic salt or salts of the particular metals, precipitating the metal or metals in the oxide or other chemically combined state on the support, and activating the precipitated material, e.g. by contact with a reducing gas such as $H_2$ at an elevated temperature between 100° and 1100° C.

It can readily be seen that ceramic catalyst blocks can be of various shapes, e.g. cylindrical, square, pie-shaped, etc. Preferably the ceramic blocks are cylindrical. As indicated above, it is particularly desirable to limit the overall cross-section of such catalysts. In a cylindrical catalyst body, for example, the diameter generally will not exceed 9 inches. The length of the catalyst generally may vary from ¼ to 6 inches.

Referring back to FIG. 2, gussets 22 are provided in the inlet section 8 and outlet section 9 (not shown) to reinforce the housing mechanically. Muffling means may be provided in either or both of the inlet and outlet sections of the housing or may be provided in a muffling means in series with the purifier. The additional muffling means are not shown in the drawings. It will be appreciated that the housing need not be cylindrical, it may be rectangular in shape and the inlet and outlet ports may be, for example, frusto-conical in shape. The latter design is particularly useful when the acoustical requirements in the exhaust system are high.

It will also be appreciated that dimensions of the purifier device are adjusted to the particular requirements of a given exhaust system. For example, a purifier of the design represented schematically in FIG. 2 was used to treat the exhaust of a large stationary GMC Model 6V71 diesel engine having a displacement of 71 cubic inches per cylinder or a total of 426 c.i.d. In this purifier the catalyst support plate was $\frac{2}{16}''$ thick carbon steel having a diameter of 18'' and four 5¾'' diameter apertures therein. An annular recess of $6\frac{15}{32}''$ around each aperture was provided for receiving a $\frac{1}{16}''$ thick tubular member of carbon steel of $6\frac{9}{32}''$ O.D. and $3\frac{3}{16}''$ length. The tubular members were welded to the catalyst support plate. Retained in each tubular member was a cylindrically-shaped ceramic block catalyst of 6.0'' diameter and and 3.0'' length. The ceramic block catalyst was composed of a zircon mullite skeletal structure with 0.5% palladium and 10.0% activated alumina deposited thereon, by weight, based on the total weight of catalyst plus support. A Fiberfrax cement coating was provided on the outer cylindrical surface of the ceramic block catalyst and snugly fitted against the Fiberfrax, encased between the catalyst and the inner wall of the tubular member, was a corrugated metal mesh fabric. The catalysts were positioned with the ends of the gas channels faced in the direction of the inlet and outlet ports. An annular steel ring of $\frac{1}{16}''$ thick, 6¼'' O.D. and 5¾'' I.D. was tack welded around its outer periphery to each of the tubular members on the downstream side of the catalyst. The inlet and outlet sections of the housing and the inlet and outlet ports have an overall length of about 23½''.

Optionally, pressure taps 23 and 24 of FIG. 1 are provided in the inlet and outlet ports, respectively. During the operation of some diesel engines oil carbon may deposit on the catalyst. Although less subject to clogging than particulate catalysts, the oily carbon may cause some clogging. For this reason the purifiers may be equipped with pressure taps to which pressure gauges (not shown) may be attached. When the back pressure reaches a predetermined level, the purifier may be removed, washed with detergent, blown dry with air, and reinstalled. It was found that fine carbon particles do not decrease the purifier efficiency substantially. This fine carbon can be readily removed merely by blow-through with air. Purifiers have been in operation in excess of 7500 hours without a noted decrease in efficiency.

Figure 4A:
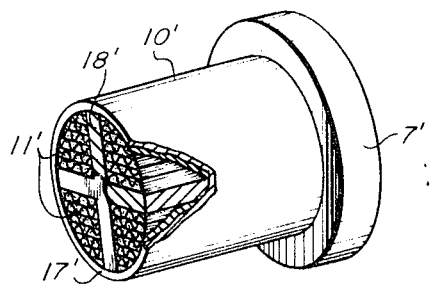
FIG. 4a is a detached perspective view, partially in section, of another structural embodiment of the support plate and a plurality of ceramic block catalyst elements secured therein.
Figure 4B:
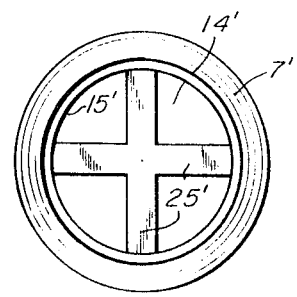

FIGS. 4a and 4b show an alternative embodiment of a catalyst support plate and catalyst design. In FIG. 4b the catalyst support plate 7' has one aperture 14' around which is an annular recess 15' for receiving a single tubular member 10'. Four sections of ceramic block catalyst 11' of general pie shape configuration are fitted together with resilient means 18' snugly positioned between the sections of blocks and also between the blocks of the inner wall of the tubular member 10' to maintain the blocks in position without movement during use. A gas flow barrier 25' is tack welded to the tubular member on the downstream side of the catalyst block.

While not confined to the use with large displacement engines or to the use with any particular type of internal combustion engine, it will be appreciated that the full advantage of the present purifier device will be gained with large displacement engines, especially diesel engines which have relatively low temperature exhausts.

It is not desired to limit this invention to the specific embodiments disclosed herein. As will be apparent to those skilled in the art numerous modifications and equivalents of the purifiers illustrated in the drawings may be made without departing from the spirit of the following claims.

What is claimed is:

1. A device for purifying exhaust gases of internal combustion engines, which device comprises a housing with gas inlet and gas outlet means on opposite ends thereof, a transverse apertured catalyst support plate spaced intermediate said inlet and outlet means and partitioning said housing into inlet and outlet sections, a plurality of ceramic block catalyst elements maintained separately from each other and secured to said apertured catalyst support plate at the apertures of said plate, said ceramic block catalyst elements being cylindrical bodies having an upstream end and a downstream end and gas flow paths therethrough, and said cylindrical bodies being secured to the apertured support plate by means comprising tubular metal housings for said cylindrical bodies, annular recesses around the apertures in the support plate for receiving the tubular members in said support plate and annular rims integral with the tubular members and inwardly directed over the downstream end of said catalyst bodies; whereby the exahust gases pass from the inlet section of the housing through the gas flow paths of the ceramic block catalyst elements into the gas outlet section of the housing.

2. A device according to claim 1 wherein said recesses for receiving the tubular members have a peripheral seat portion for the upstream end of the cylindrical catalyst bodies.

References Cited

UNITED STATES PATENTS

| | | | |
|---|---|---|---|
| 2,674,521 | 4/1954 | Houdry | 23—288.3FUR |
| 2,887,456 | 5/1959 | Halford et al. | |
| 3,441,381 | 4/1969 | Keith et al. | 23—288.3F |
| 3,441,382 | 4/1969 | Keith et al. | 23—288.3F |

JAMES H. TAYMAN, JR., Primary Examiner

U.S. Cl. X.R.

23—2E; 60—29; 252—439, 477